May 8, 1934.                L. L. GRAHAM                1,957,455
                    AUTOMOBILE BRAKE TESTING DEVICE
                       Filed Oct. 16, 1930         4 Sheets-Sheet 2
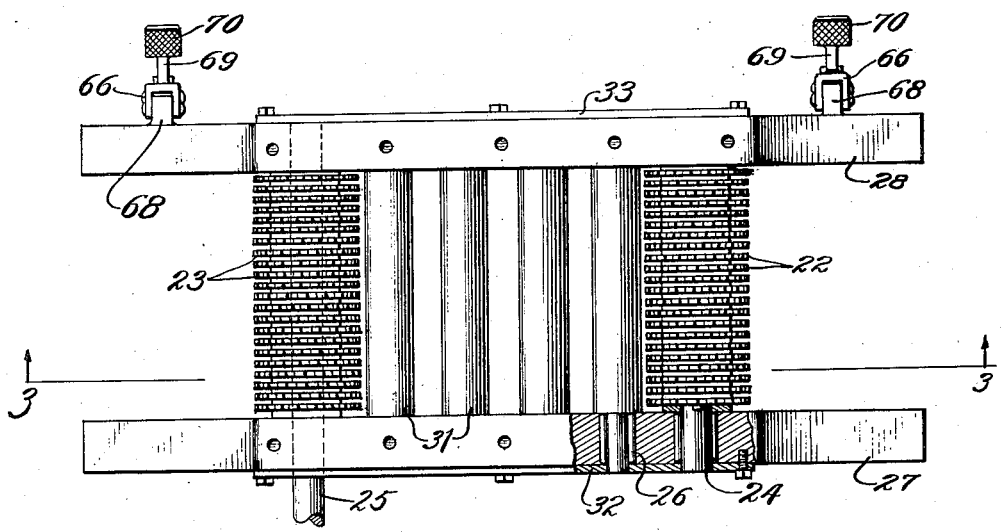
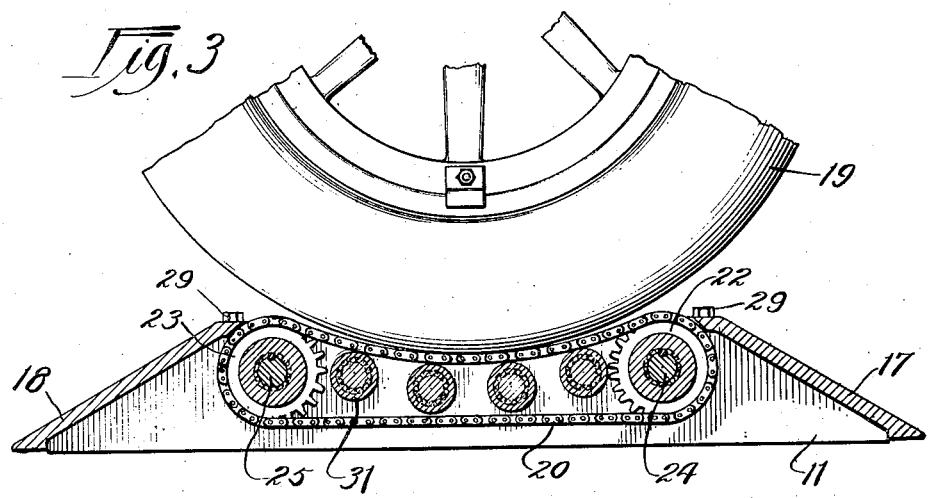
Inventor:
Leon L. Graham.
By Carl S. Lloyd
       Attorney.

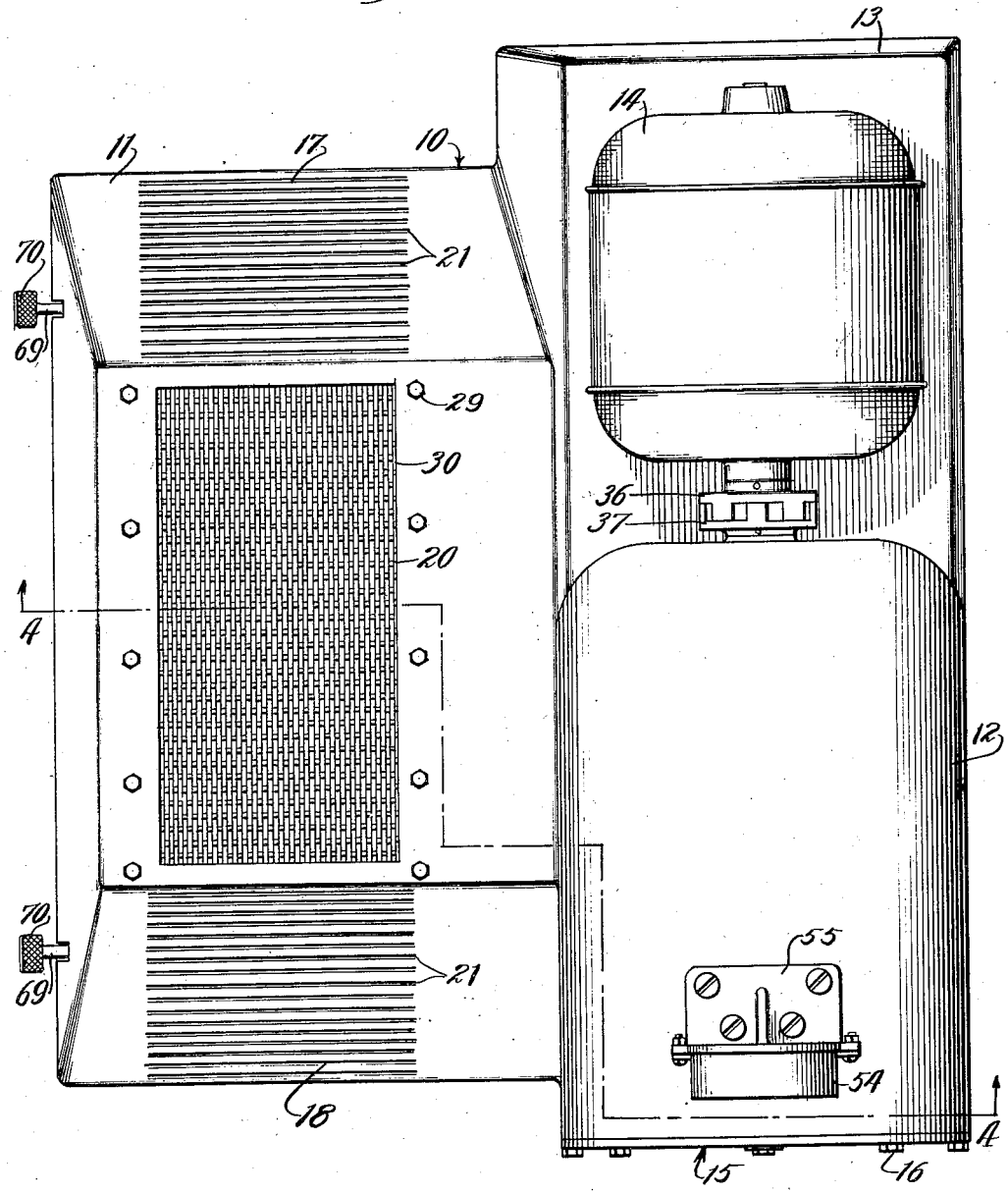

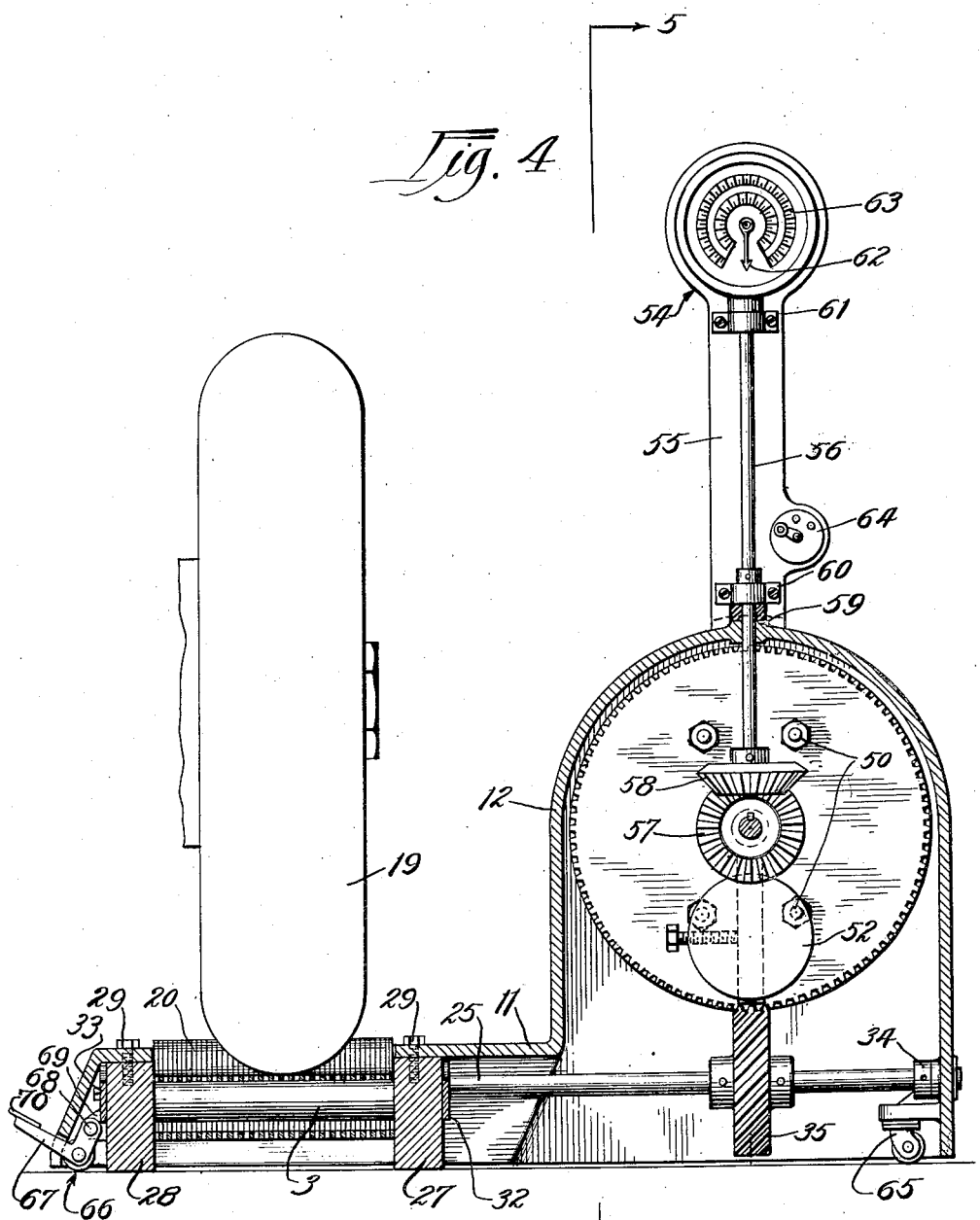

May 8, 1934.　　　　L. L. GRAHAM　　　　1,957,455
AUTOMOBILE BRAKE TESTING DEVICE
Filed Oct. 16, 1930　　　4 Sheets-Sheet 4

Fig. 5

Inventor:
Leon L. Graham,
By Carl S. Lloyd
　Attorney.

Patented May 8, 1934

1,957,455

UNITED STATES PATENT OFFICE 1,957,455

AUTOMOBILE BRAKE TESTING DEVICE

Leon L. Graham, Chicago, Ill., assignor to Bendix-Cowdrey Brake Tester, Inc., Dover, Del., a corporation of Delaware Application October 16, 1930, Serial No. 489,018

7 Claims. (Cl. 265—25)

This invention relates to a brake testing device particularly designed for use in the testing of automobile brakes.

An object of the invention is to provide in a device of this character an endless belt drive which will assure positive frictional engagement between the wheel rotating means and the peripheral face of the automobile wheel.

Further objects and advantages of the invention will be apparent as I proceed with my specification, which, taken in connection with the accompanying drawings, discloses a preferred embodiment thereof.

Referring to the drawings:

Fig. 1 is a top plan view of the brake testing device;

Fig. 2 is a top plan view, partly in section, showing a portion of the driving unit;

Fig. 3 is a section taken on the line 3—3 of Fig. 2 and showing the construction of the wheel driving mechanism;

Fig. 4 is a section taken substantially on the line 4—4 of Fig. 1; and

Fig. 5 is a section taken substantially on the line 5—5 of Fig. 4.

The major portion of the operative mechanism of the device is contained within a housing 10, which includes a tread portion 11, over which a wheel of the car may pass, and a gear housing portion 12 in which are contained the power transmitting gears and the differential gears which actuate the measuring mechanism. The housing 10 includes, in addition, a base portion 13, which serves as a support for a motor 14, said motor being secured to the base by bolts 14a (Fig. 5). The entire housing 10 may be cast as a single unit except for an end plate 15 which is removably secured to the gear housing 12 by bolts 16. The tread portion 11 of the housing is tapered to afford inclined faces 17 and 18 by which an automobile wheel 19 may be easily raised to bring the wheel into engagement with an endless driving belt 20. The inclined faces 17 and 18 may be corrugated as indicated at 21 to prevent slipping of the tire thereon when the wheel is being moved to or from the elevated position.

Referring to Figs. 2, 3 and 4, it will be observed that the endless belt or chain 20 takes over an assembly of sprocket wheels 22 and 23, carried by shafts 24 and 25, respectively, said shafts being journaled at their opposite ends in bearings 26, which are formed in a pair of bearing support members 27 and 28, said bearing support members being secured to the wheel supporting housing 11 by bolts 29. The upper face of the belt 20 is exposed for engagement with the automobile wheel 19, the housing 11 being cut away as indicated at 30, to provide a rectangular open space for the upper face of the belt. The sprocket wheels 22 and 23 project slightly above the top face of the housing 11 and a series of intermediate supporting rollers 31 afford a support for the driving face of the belt 20. As will appear from Fig. 2, the sprocket wheels 22 and 23 mounted on the shafts 24 and 25, respectively, in effect constitute sprocket drums which, together with the driving belt and the rollers 31, afford a support for the wheel 19. The supporting rollers 31 are journaled at their opposite ends in the bearing supports 27 and 28 and are arranged to support the driving belt 20 in an arcuate path which conforms to the peripheral face of the wheel 19.

In the embodiment shown the two innermost of the belt supporting rollers 31 are positioned slightly below the outer pair of rollers, thereby affording an arc-shaped support for the belt. It will be apparent that a similar effect could be obtained by having the axes of the rollers 31 positioned in the same plane, but varying the size of the rollers to afford a curved path of support for the driving belt 20. By arranging the sprocket wheels 22 and 23 and the roller support drums 31 in this manner, a positive driving engagement between the driving belt 20 and the automobile wheel 19 is assured. A pair of removable end plates 32 and 33 secured to the bearing supports 27 and 28, respectively, may be provided to afford additional bearing support for the shafts 24 and 25 and the belt supporting rollers 31.

The sprocket drums 22 and 23 are driven from the shaft 25 which extends through the gear housing 12, the end of the shaft being journaled in a bearing 34 mounted in the far wall of the gear housing 12. A gear 35 is carried on this shaft, said gear having operative connection with the motor 14 through the gear train now to be described.

Referring to Fig. 5, the armature shaft of the motor 14 carries a clutch member 36, which engages a clutch member 37 mounted on a stub shaft 38, said stub shaft being journaled in the forward wall of the gear housing 12. A shaft 39 is journaled at one end in a bearing 40 carried by the end plate 15 and is held in alignment with the stub shaft 38 by a sleeve 41, which affords a supporting connection between the adjacent free ends of the shafts 38 and 39. The shafts 38 and 39 are connected by a differential, which comprises bevelled pinions 42 and 43, carried by the shafts 38 and 39, respectively, and bevelled gear wheels 44 and 45, which are mounted for free rotation on stub shafts which are journaled at 46 and 47, respectively, on the opposite side walls of a differential housing 48. The housing 48 is secured at one end, as indicated at 49, to the hub of the pinion 42, said housing being secured at the opposite end by means of bolts 50 to a gear wheel 51 which has free rotation on the hub of the pinion 43. The gear wheel 51 meshes with the gear 35, which in turn drives the sprocket drums which carry the endless driving belt 20.

The measuring mechanism for determining the amount of the brake resistance comprises a weight 52 adjustably mounted on a weight support arm 53, carried by the shaft 39, and an indicating dial 54, which is supported on a bracket 55, carried by the gear housing 12, said dial being actuated by a shaft 56, which is driven from the shaft 39 through bevelled pinions 57 and 58 carried by the shafts 39 and 56, respectively. The dial shaft 56 is supported near its lower end by a bearing 59 mounted in the top wall of the gear housing 12. A pair of bearings 60 and 61, carried by the support bracket 55, afford a support for the upper portion of the dial shaft 56. The dial 54 includes an indicator hand 62 (Fig. 4), which plays over a scale 63 to indicate the amount of brake resistance. A motor starting switch 64 is mounted on the dial supporting bracket 55.

Assuming that there is no resistance on the driving belt 20, the transmission of power from the motor 14 will be through the pinion 42 and the housing 48 to the gear wheel 51, which turns the gear 35 to rotate the sprocket drums, which in turn drive the belt 20. The shaft 39, which actuates the measuring mechanism, does not turn, inasmuch as the path of least resistance through the differential is through the housing 48 and the gear wheel 51, the weight 52 being sufficient to hold the pinion 43 stationary. When, however, resistance is applied to the movement of the driving belt 20, by reason of the application of a brake force to the automobile wheel 19, the resistance thereby afforded is transmitted through the gear train 35 and 51 to the differential housing 48 and, if the retarding effect is appreciable, the rotational movement of the pinion 42, instead of being transmitted entirely to the driving belt 20, will be divided proportionately, according to the ordinary principle of operation of a differential, between the differential housing 48 and the pinion 43. If the braking resistance on the driving belt 20 is sufficient to be measurable, the weight 52 will be raised a distance proportionate to the brake resistance applied, and the measuring dial 52 will give a reading corresponding to the braking force applied to the automobile wheel 19.

Referring to Figs. 1, 4 and 5, it will be noted that the housing 10 is provided with a pair of casters 65, which are fixedly secured to the inner wall of the gear housing 12, and a pair of adjustable casters 66, which are secured to the bearing support 28. The fixed casters 65 project slightly below the lower edge of the housing 12. The adjustable casters 66 are journaled in bifurcated bell cranks 67, the short arms of which are pivotally mounted at 68 to brackets 69, carried by the bearing support 28. The long arms of the cranks 67 project through the housing 11, and are provided at their outer free ends with foot treadles 70. In the position shown in Fig. 4, the casters 66 have been raised to allow the bearing support members 27 and 28 to rest on the supporting floor. After the automobile wheel is removed, the casters 66 may be depressed by stepping on the foot treadles 70, and will then movably support the wheel-supporting housing 11. The entire device may then be readily rolled into position for testing another wheel. It will be understood, also, that the device just described might be duplicated, or provision otherwise made, for testing the brakes on two or more wheels of the car at the same time.

The foregoing detailed description has been given for clearness of understanding only, and no unnnecessary limitations should be understood therefrom, but the appended claims should be construed as broadly as permissible in view of the prior art.

What I regard as new and desire to secure by Letters Patent is:

1. A brake-testing device for testing the action of the brakes upon the wheels of an automobile, comprising, a base, a pair of sprockets carried by said base, an endless driving belt taking over said sprockets adapted to support one of the wheels of an automobile, rollers for supporting the driving face of said belt, said rollers being positioned to support the driving face of the belt in an arcuate path conforming to the peripheral face of the wheel, power driving means for moving said belt to turn the wheel under brake resistance including yieldable resisting means, and means for measuring the resistance to rotation of the wheel.

2. A brake-testing machine for testing the action of the brakes upon the wheels of an automobile, comprising, a base, a pair of sprockets carried by said base, an endless driving belt taking over said sprockets and adapted to support one of the wheels of an automobile, inner and outer pairs of belt supporting rollers, said inner pair of rollers being positioned slightly below said outer pair of rollers to allow the driving face of the belt to conform to the peripheral face of the wheel, power driven means for moving said belt to turn the wheel under brake resistance, including yieldable resisting means and indicating means operable to measure the resistance applied to the automobile wheel.

3. A brake-testing device for testing the action of the brakes upon the wheels of an automobile, comprising, a base including a pair of bearing support members extending longitudinally of the base, a pair of sprocket drums journaled at their opposite ends in said bearing support members, an endless driving belt taking over said drums and adapted to support one of the wheels of an automobile, belt supporting rollers journaled at their opposite ends in said bearing support members, said belt supporting rollers being positioned to support the driving face of the belt in an arcuate path conforming to the peripheral face of the wheel, power driven means for moving said belt to turn the wheel under brake resistance, including yieldable resisting means and indicating means operable to measure the resistance applied to the automobile wheel.

4. A brake testing machine comprising a wheel supporting member including a base, spaced sprockets positioned for rotation on the base, a chain belt on the sprockets, and a plurality of rollers for supporting the belt arranged in spaced relation between the sprockets in an arc the axis of which is above the sprockets and the rollers.

5. A brake testing machine comprising a wheel supporting member including a base, parallel gangs of sprockets arranged for rotation on the base, a chain belt positioned for travel on the sprockets, and a plurality of rollers arranged in spaced relation between the sprockets in an arc the axis of which is above the sprockets and the rollers.

6. A brake testing machine comprising a wheel supporting member including a base having an opening in the top thereof, sprockets positioned for rotation on the base, a chain belt on the sprockets closing the opening, and a plurality of rollers supporting the belt and arranged in spaced relation between the sprockets in an arc the axis of which is above the sprockets and the rollers.

7. A brake testing machine comprising a wheel supporting member including a base having ramps at its respective ends and an opening in the top thereof, a sprocket supported for rotation on the base adjacent each of the ramps, a chain belt on the sprockets beneath the opening in the base, and a plurality of rollers positioned for rotation on the base for supporting the belt, said rollers being arranged in spaced relation between the sprockets and in an arc the axis of which is above the sprockets and the rollers.

LEON L. GRAHAM.